United States Patent [19]
Kasao

[11] Patent Number: 5,850,475
[45] Date of Patent: Dec. 15, 1998

[54] METHOD AND APPARATUS FOR DIVIDING IMAGE AREA

[75] Inventor: Atsushi Kasao, Kanagawa, Japan

[73] Assignee: Fuji Xerox Co., Ltd., Tokyo, Japan

[21] Appl. No.: 950,534

[22] Filed: Oct. 15, 1997

Related U.S. Application Data

[63] Continuation of Ser. No. 422,254, Apr. 14, 1995, abandoned.

[30] Foreign Application Priority Data

May 10, 1994 [JP] Japan ..................................... 6-096328

[51] Int. Cl.[6] ................................ G06K 9/34; G06K 9/40
[52] U.S. Cl. .......................... 382/173; 382/199; 382/268
[58] Field of Search ..................................... 382/173, 174, 382/176, 178, 180, 199, 205, 266, 268–269

[56] References Cited

U.S. PATENT DOCUMENTS

| | | | |
|---|---|---|---|
| 4,764,971 | 8/1988 | Sullivan | 382/173 |
| 4,831,659 | 5/1989 | Miyaoka et al. | 382/240 |
| 4,944,023 | 7/1990 | Imao et al. | 382/240 |
| 5,073,962 | 12/1991 | Califano | 382/205 |
| 5,185,808 | 2/1993 | Cok | 382/268 |
| 5,311,307 | 5/1994 | Yoshimoto | 348/384 |
| 5,319,720 | 6/1994 | Yokoyama et al. | 382/145 |
| 5,519,789 | 5/1996 | Etoh | 382/225 |
| 5,604,822 | 2/1997 | Pearson et al. | 382/199 |
| 5,710,840 | 1/1998 | Hideshima et al. | 382/268 |

OTHER PUBLICATIONS

Hiromasa Nakatani, Kenji Ohsaki, Keiichi Abe, "Object Boundary Detection Using Multiple Results of Segmentation," IEICE BI, J76–D2, 4, (1993) pp. 914–916.

Nobuaki Izumi, Hiroyuki Morikawa, Hiroshi Harashima, "Combining Color and Spatial Information for Segmentation," Abstract of IEICE, Spring National Meeting, D–680 (1991).

*Primary Examiner*—Leo H. Boudreau
*Assistant Examiner*—Bhavesh Mehta
*Attorney, Agent, or Firm*—Finnegan, Henderson, Farabow, Garrett & Dunner, L.L.P.

[57] ABSTRACT

In a method and apparatus for dividing an image area according to the present invention, when data of a quantized multi-gradational image are to be divided into regions according to a texture of the image, the quantized multi-gradational image data are divided into plural rectangular subareas and boundary areas. Each of the rectangular subareas and a boundary area in the periphery of the subarea are combined to form one set. The area dividing is conducted on each of the sets. In the area dividing, the subarea is subjected one time to a dividing process, and the boundary area is subjected two or more times to a dividing process.

9 Claims, 14 Drawing Sheets

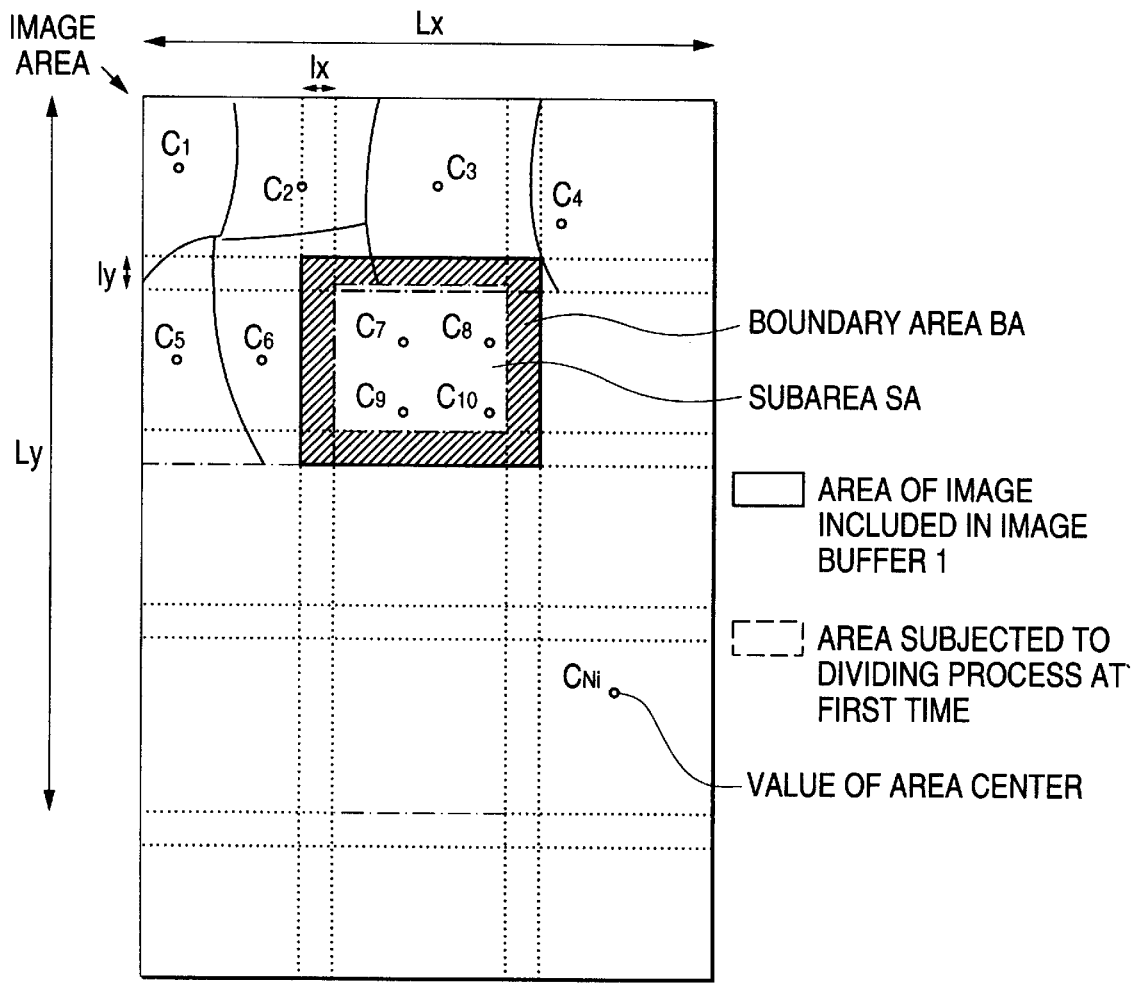

FIG. 2A

FIG. 2B
DIVIDED AREA 3: FEATURE INFORMATION OF DIVIDED AREA 3
DIVIDED AREA 6: FEATURE INFORMATION OF DIVIDED AREA 6
DIVIDED AREA 7: FEATURE INFORMATION OF DIVIDED AREA 7
DIVIDED AREA 8: FEATURE INFORMATION OF DIVIDED AREA 8
DIVIDED AREA 9: FEATURE INFORMATION OF DIVIDED AREA 9
DIVIDED AREA 10: FEATURE INFORMATION OF DIVIDED AREA 10

FIG. 2C
DIVIDED AREA 1: FEATURE INFORMATION OF DIVIDED AREA 1
DIVIDED AREA 2: FEATURE INFORMATION OF DIVIDED AREA 2
DIVIDED AREA 3: FEATURE INFORMATION OF DIVIDED AREA 3
DIVIDED AREA 4: FEATURE INFORMATION OF DIVIDED AREA 4
DIVIDED AREA 5: FEATURE INFORMATION OF DIVIDED AREA 5
DIVIDED AREA 6: FEATURE INFORMATION OF DIVIDED AREA 6

FIG. 4A

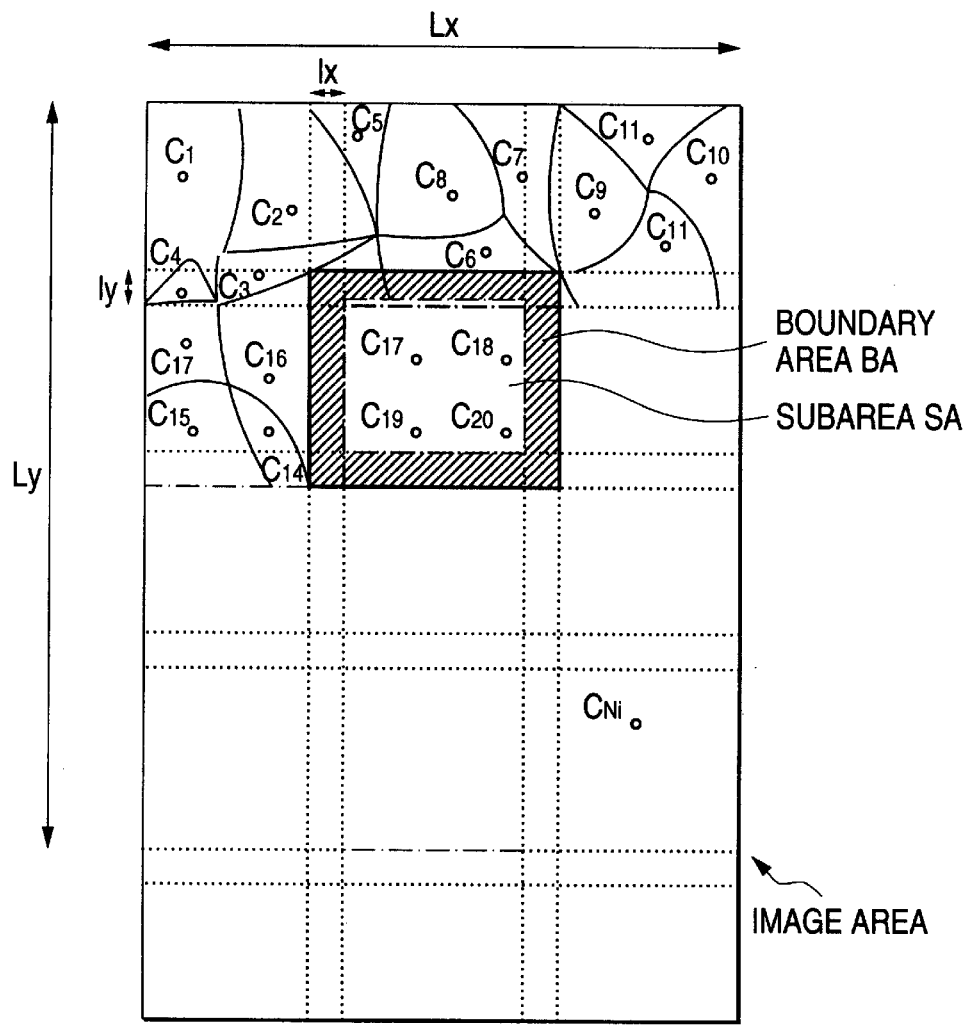

FIG. 4B
```
DIVIDED AREA 6:  NO6, CrO6, CgO6, CbO6, (CxO6, CyO6)
DIVIDED AREA 16: NO16, CrO16, CgO16, CbO16, (CxO16, CyO16)
DIVIDED AREA 17: NO17, CrO17, CgO17, CbO17, (CxO17, CyO17)
DIVIDED AREA 18: NO18, CrO18, CgO18, CbO18, (CxO18, CyO18)
DIVIDED AREA 19: NO19, CrO19, CgO19, CbO19, (CxO19, CyO19)
DIVIDED AREA 20: NO20, CrO20, CgO20, CbO20, (CxO20, CyO20)
```

FIG. 4C
```
DIVIDED AREA 1:  N1,i, Cr1,i, Cg1,i, Cb1,i, (Cx1,i, Cy1,i)
DIVIDED AREA 2:  N2,i, Cr2,i, Cg2,i, Cb2,i, (Cx2,i, Cy2,i)
DIVIDED AREA 3:  N3,i, Cr3,i, Cg3,i, Cb3,i, (Cx3,i, Cy3,i)
DIVIDED AREA 4:  N4,i, Cr4,i, Cg4,i, Cb4,i, (Cx4,i, Cy4,i)
                            .
                            .
                            .
DIVIDED AREA 16: N16,i, Cr16,i, Cg16,i, Cb16,i, (Cx16,i, Cy16,i)
```

FIG. 12A

| | |
|---|---|
| DIVIDED AREA a | d, z, k, v, s, .... |
| DIVIDED AREA b | d, d, v, r, z, .... |
| DIVIDED AREA c | a, f, e, p, z, .... |
| DIVIDED AREA d | a, o, h, i, f, .... |
| DIVIDED AREA e | f, m, w, h, q, .... |

AREA INTEGRATION MAP IN WHICH LISTING TOP N DIVIDED AREAS HAVING SHORTEST DISTANCES ARE LISTED

FIG. 12B

| | |
|---|---|
| DIVIDED AREA a | d, k, v |
| DIVIDED AREA b | d, r, d, v |
| DIVIDED AREA c | p |
| DIVIDED AREA d | a, o |
| DIVIDED AREA e | f, m |

AREA INTEGRATION MAP IN WHICH DIVIDED AREAS HAVING SMALL COLOR DIFFERENCES ARE INTEGRATED

FIG. 12C

| | |
|---|---|
| DIVIDED AREA a | d, k, v, b, r, d, o |
| DIVIDED AREA b | |
| DIVIDED AREA c | p, |
| DIVIDED AREA d | |
| DIVIDED AREA e | f, m |

ALL GROUPS EXISTING SAME DIVIDED AREA NUMERALS ARE INTEGRATED

FIG. 15

DIVIDED AREA 1: $N_{1,i}$, $Cr_{1,i}$, $Cg_{1,i}$, $Cb_{1,i}$, $(Cx_{1,i}, Cy_{1,i})$
DIVIDED AREA 2: $N_{2,i}$, $Cr_{2,i}$, $Cg_{2,i}$, $Cb_{2,i}$, $(Cx_{2,i}, Cy_{2,i})$
DIVIDED AREA 3: $N_{3,i}$, $Cr_{3,i}$, $Cg_{3,i}$, $Cb_{3,i}$, $(Cx_{3,i}, Cy_{3,i})$
DIVIDED AREA 4: $N_{4,i}$, $Cr_{4,i}$, $Cg_{4,i}$, $Cb_{4,i}$, $(Cx_{4,i}, Cy_{4,i})$
.
.
DIVIDED AREA 20: $N_{20,i}$, $Cr_{20,i}$, $Cg_{20,i}$, $Cb_{20,i}$, $(Cx_{20,i}, Cy_{20,i})$

FIG. 16A

| | | |
|---|---|---|
| DIVIDED AREA 1 | 2, 4, 3, 17, 5, 16, 15 | AREA INTEGRATION MAP IN WHICH LISTING TOP 8 DIVIDED AREAS HAVING SHORTEST DISTANCES ARE LISTED |
| DIVIDED AREA 2 | 3, 1, 4, 5, 8, 17, 6, 16 | |
| DIVIDED AREA 3 | 2, 4, 5, 8, 17, 1, 16, 7 | |
| DIVIDED AREA 4 | 3, 17, 2, 1, 16, 15, 14, 5 | |
| DIVIDED AREA 5 | 8, 2, 6, 7, 3, 1, 4, 17 | |

FIG. 16B

| | | |
|---|---|---|
| DIVIDED AREA a | 2, 4, 17, 16, 15 | AREA INTEGRATION MAP IN WHICH DIVIDED AREAS HAVING SMALL COLOR DIFFERENCES ARE INTEGRATED |
| DIVIDED AREA b | 1, 4, 17, 6, 16 | |
| DIVIDED AREA c | 5, 8, 7 | |
| DIVIDED AREA d | 17, 2, 1, 15, 14, 5 | |
| DIVIDED AREA e | 8 | |

FIG. 16C

| | | |
|---|---|---|
| DIVIDED AREA a | 1, 2, 4, 6, 14, 17, 16, 15 | ALL GROUPS EXISTING SAME DIVIDED AREA NUMERALS ARE INTEGRATED |
| DIVIDED AREA b | | |
| DIVIDED AREA c | 5, 8, 7 | |
| DIVIDED AREA d | | |
| DIVIDED AREA e | | |

METHOD AND APPARATUS FOR DIVIDING IMAGE AREA

This application is a continuation of application Ser. No. 08/422,254, filed Apr. 14, 1995, now abandoned.

1. Field of the Invention

The present invention relates to a method and apparatus for dividing a quantized continuous gradational image.

2. Description of the Related Art

A process of dividing an input image into appropriate areas is an important technique which is widely used as a preprocessing in various fields of image processing. In an image editing process, for example, an area to be edited must be clipped out, and the area dividing is employed in this clipping process. In a recognition process, the area dividing is used as a preprocessing for detecting an object to be recognized. The performance of the whole of such a process largely depends on that of the area dividing. Consequently, it has been desired to develop a high performance area dividing method.

Recently, in a process wherein highly common image features which can be used in various image processing applications are extracted and collated, it has been attempted to organize such features for each image area so that the features are easily used in subsequent image processing. Also in such organization, it is required to adequately divide an image into areas.

A well-known example of techniques of the area dividing is the K-means clustering algorithm (see Nakatani et al., "Object Boundary Detection Using Multiple Results of Segmentation," IEICE BI, J76-D2, 4, pp. 914–916 (1993), etc.). Furthermore, a method is proposed in which the K-means clustering algorithm is executed in a five-dimensional system, i.e., color components of an image, such as red (R), green (G) and blue (B), and x and y coordinates of the image (see Izumi et al. "Combining Color and Spatial Information for Segmentation", Abstract of IEICE, Spring National Meeting, D-680(1991)). Also, other approaches such as that using the MAP (maximum a posteriori probability) estimation are proposed.

Conventionally, when an image such as a color image is to be divided, the whole area of the image have to be stored once in a working memory, and the process of dividing the image is then conducted. This method requires a large amount of memory and is slow. In the dividing method in which parallel processing cannot be executed, particularly, the processing period is prolonged by the factor of the square of the number of divided areas, with the result that such a method consumes a very long processing period.

In order to solve these problems, it may be possible to take a countermeasure in which, in place of conducting a process of inputting a large amount of data at one time, an image is divided into plural subareas, and these subareas are separately processed. However, such a countermeasure has the drawbacks that an outline of a subarea may unnaturally remain in the area to be divided, and that dividing in the vicinity of an outline of a subarea may unnaturally be conducted.

SUMMARY OF THE INVENTION

The present invention has been conducted in order to solve the problems discussed above. It is an object of the invention to provide a method and apparatus for dividing an image area which can conduct a process for dividing and/or integrating a large image with using a small capacity working memory and in a short period.

A method for dividing an image area according to the present invention in which data of a quantized multi-gradational image are divided into areas corresponding to a texture of the image, comprising the steps of: dividing the data of the quantized multi-gradational image into a plurality of subareas and boundary areas which are provided between adjacent subareas, each of the subareas and boundary areas in the periphery of each of the subareas forming a block; and subjecting each of the blocks to a dividing process to divide the block into divided areas.

According to the invention, an algorithm is provided in which a large image is divided into plural rectangular subareas and boundary areas, and, when an image segregating process is conducted on each of the rectangular subareas, information of a divided area in a boundary area adjacent to the rectangular subarea is used, thereby solving the problems in the prior art which are due to the process of dividing an image into rectangular subareas. According to the invention, furthermore, a method of giving an individual feature to a divided area is provided.

BRIEF DESCRIPTION OF THE DRAWINGS

In the accompanying drawings;

FIG. 2A is a diagram showing relationships between rectangular subareas which are used as the basic unit of the area dividing, information written into a working buffer, and areas held in an image buffer;

FIG. 2B shows information written into a working buffer which is used when a rectangular subarea is to be divided;

FIG. 2C shows information written into a divided area map;

FIG. 4A is a diagram showing an image area held by an image buffer, and centers of divided areas in an initial state;

FIG. 4B shows information written into a working buffer which is used when a rectangular subarea is to be divided;

FIG. 4C shows information written into a divided area map;

FIG. 12A shows an area integration map in which top N divided area having shortest distances are listed;

FIG. 12B shows an area integration map in which divided areas having small color differences are integrated;

FIG. 12C shows an updated area integration map;

FIG. 15 is a diagram showing a divided area map in which information of divided areas included in, the image which has been subjected to the area dividing;

FIG. 16A shows an area integration map in which top eight divided area having shortest distance are listed;

FIG. 16B shows an area integration map in which divided areas having small color differences of the top eight divided area are integrated;

FIG. 16C shows an area integration map in which all groups existing same divided area numerals are integrated;

DETAILED DESCRIPTION OF THE INVENTION

The detailed description of the present invention will be described referring to the accompanying drawings as follows.

Figure 1:
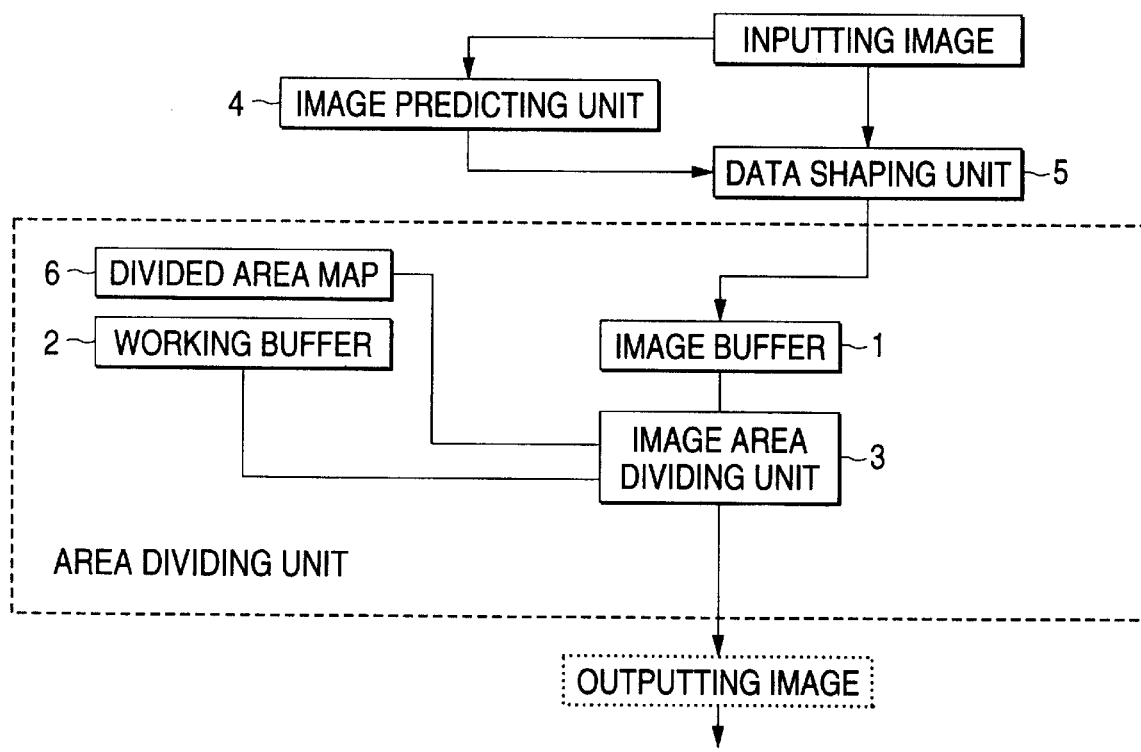
FIG. 1 is a block diagram showing the basic configuration for realizing the image area dividing method of the invention.

FIG. 1 is a block diagram showing the basic configuration for realizing the image area dividing method of the invention. FIG. 2A is a diagram showing a relationship among rectangular subareas to be a basic unit of the area dividing, information written into a working buffer, and areas held in an image buffer.

As shown in FIG. 2A, a large image is divided into plural rectangular subareas SA, and frame-like boundary areas which respectively surround or are in the periphery of the rectangular subareas SA. The widths of each boundary area BA in the x- and y-directions of the image are indicated by lx and ly, respectively. An image area dividing apparatus shown in FIG. 1 has an area dividing unit including: an image buffer 1 which is larger than a rectangular subarea SA by the lengths corresponding to pixels of 2×lx and 2×ly in lateral and vertical directions; a working buffer 2 which, when a rectangular subarea SA and a boundary area BA adjacent to the rectangular subarea SA are to be subjected to a dividing process, stores information of the rectangular subarea SA, and that of divided areas existing in the boundary area BA adjacent to the rectangular subarea SA; a divided area map 6 which stores information of all divided areas which have been divided; and image area dividing unit 3 for adequately dividing the image in the image buffer 1, using information stored in the divided area map 6 and the working buffer 2.

In many cases, an input image usually has a defect such as included noise, that it is a dot image, or that it degrades to some extent. In some cases, an input image may have a resolution which is too high for the area dividing. To comply with these cases, it is required to dispose image predicting unit 4 for predicting an optimum image for the area dividing, and data shaping unit 5 for shaping data in accordance with the prediction, in front of the area dividing unit including the image buffer 1, the working buffer 2, the image area dividing unit 3, and the divided area map 6.

In a simple configuration, the image predicting unit 4 calculates an optimum value for Gaussian and Laplacian filters on the basis of a size of an image under circumstances where an input image is utilized, and a distance at which a person watches an image, and the data shaping unit 5 applies a filter which is designed based on the value, to an input image.

The image area dividing unit 3 and the divided area map 6 may store various kinds of data. However, they have to store at least information of a divided area which has already been subjected to the dividing process and which is adjacent to a rectangular subarea SA that is currently processed. Such information includes the number of pixels in the divided area, average colors of the area, and the center of gravity of the area. Preferably, the unit and map further have information of the image texture and the like of the area.

The image area dividing unit 3 may employ a method in which the K-means clustering algorithm or the MAP estimation is used in an extended space where position information x and y is added to a color space.

FIG. 2A shows the area (indicated by the frame of the thick line) of an image held in the image buffer 1, and that the image area dividing unit 3 uses what information of a divided area from information in the divided area map 6. More specifically, FIG. 2A shows relationships between the rectangular subarea SA and the boundary area BA, FIG. 2B shows information written into the working buffer 2 which is used when the rectangular subarea SA is to be divided, and FIG. 2C shows information written into the divided area map 6.

Even among pixels which have already been subjected to the dividing, pixels which are in the boundary area BA, i.e., pixels which are in area $C_3$ or $C_6$ and also in the boundary area BA are again subjected to the dividing. In the dividing, information of areas $C_3$ and $C_6$ which is written into the divided area map 6 is read out, and the read out information of areas $C_3$ and $C_6$ is written into the working buffer 2 and then used in the dividing process conducted by the image area dividing unit 3.

As shown in FIG. 2A, with respect to an image which is shaped so as to be easily divided, the image buffer 1 holds an image which is larger than the rectangular subarea SA by the lengths corresponding to pixels of 2·ly and 2·lx in vertical and lateral directions, and supplies an image which will be handled by the image area dividing unit 3.

The divided area map 6 holds some of feature information of divided areas which are divided by the image area dividing unit 3, i.e., at least the number of pixels in each of the divided area, average colors of the area, and the center of gravity of the area, etc.

The working buffer 2 is a buffer which temporarily holds information of divided areas when the image area dividing unit 3 conducts the dividing process.

The image area dividing unit 3 conducts the area dividing according to the K-means clustering algorithm on image data held in the image buffer 1, on the basis of information of divided areas stored in the working buffer 2 and the divided area map 6. After the process, feature information of the divided areas is written into the divided area map 6.

If an input image has various image structures such as a dot image or an input image is not adequate for the image dividing, the image predicting unit 4 predicts the manner of changing the input image to that which is suitable for the area dividing.

The data shaping unit 5 shapes data of the input image so that the input image is changed to the vicinity of that predicted by the image predicting unit 4.

Hereinafter, embodiments of the present invention will be described in detail by illustrating embodiments shown in the accompanying drawings.

EMBODIMENT 1

Figure 3:
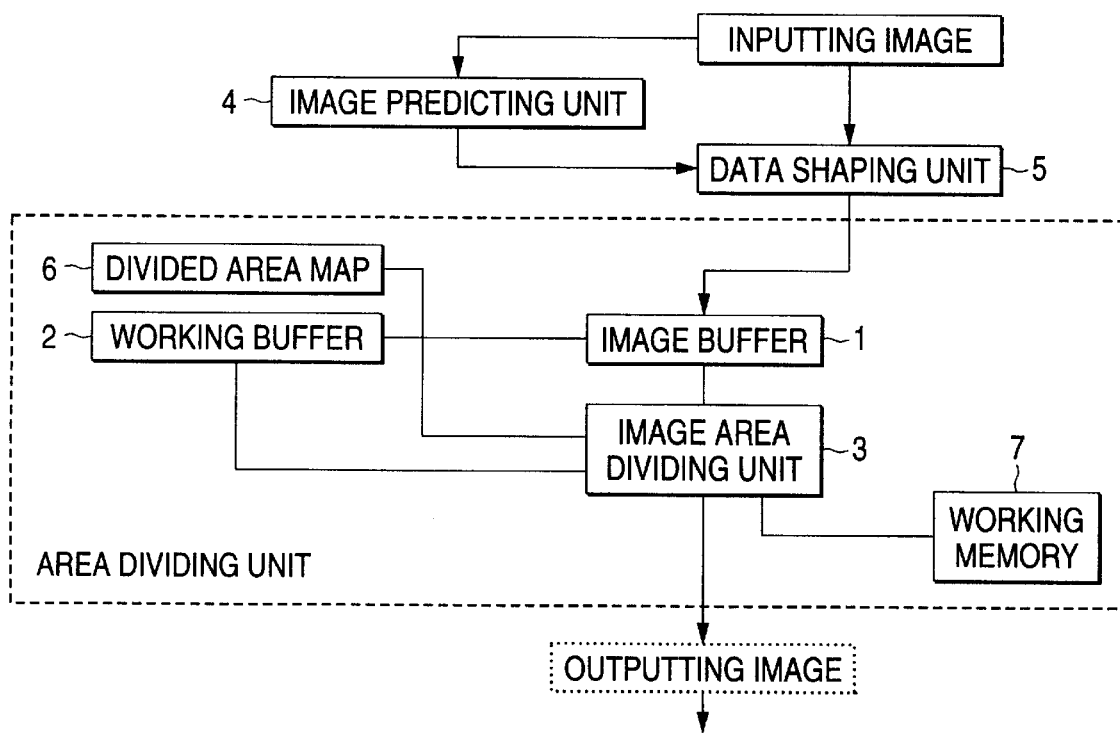
FIG. 3 is a block diagram of an embodiment of an image area dividing apparatus to which the present invention is applied.

FIG. 3 is a block diagram of an embodiment of an image area dividing apparatus to which the present invention is applied. The apparatus is basically structured in the same manner as that shown in FIG. 1 except that the image buffer 1 and the working buffer 2 are connected to each other, and that a working memory 7 is connected to the image area dividing unit 3.

The operation of the apparatus shown in FIG. 3 will be described in accordance with the actual flow of data. It is assumed that image data having Lx pixels in lateral directions and Ly pixels in vertical directions have been appropriately shaped by the data shaping unit 5 so as to have a suitable form.

The shaped data are divided into N×M rectangular subareas SA (N indicates the number of divided subareas in lateral directions, and M the number of divided subareas in vertical directions), and divided areas BA in the periphery of the subareas.

Hereinafter, the case where N and M are set to be 3 and 5, respectively so that image data are divided into 15 rectangular subareas SA will be considered. Boundary areas BA are formed between adjacent rectangular subareas SA (see FIG. 2A). Only the image area which is held in the image buffer 1 can be processed at one time. The portion obtained by eliminating the area which is subjected to the area dividing at the first time (the area in the frame of the broken line) from the image area (the area in the frame of the thick line) which is held in the image buffer 1 shown in FIG. 1 has already been subjected to the area dividing. Sixteen area centers are placed in the area which is subjected to the area dividing at the first time by the area dividing of one rectangular subarea SA and a boundary area BA in the periphery of the subarea. The boundary area BA has a width of lx pixels in the x-direction, and a width of ly pixels in the y-direction. The value of lx is set to be equal to (⅕)×the width of the rectangular subarea, and that of ly to be equal to (⅕)×the height of the rectangular subarea. The image buffer 1 must have a size sufficient for holding data of the pixels in a rectangular subarea SA and a boundary area BA surrounding the subarea. Therefore, the sizes of the image buffer 1 in the vertical and lateral directions are required to be 1.4 times those of a rectangular subarea SA, respectively. The set of a rectangular subarea SA to be processed and a boundary area BA is sequentially shifted rightward with starting from the one at the upper left corner. When the process reaches the set at the right end, the process is transferred to the next row and then further continued while sequentially moving in the sequence starting from the set at the left end.

It is assumed that the area dividing has already been conducted on several rectangular subareas SA and boundary areas BA surrounding them. FIG. 4A shows the areas which have already been processed, the rectangular subarea SA which is currently processed, and the boundary area BA surrounding it. Specifically, FIG. 4A shows divided areas, FIG. 4B shows information written into the working buffer 2 which is used in the dividing of the rectangular subarea SA, and FIG. 4C shows information written into the divided area map 6.

In the area dividing, the K-means clustering algorithm in a five-dimensional system in which x- and y-axes exist in addition to the axes of three colors or R, G and B is used. The process is conducted in the following manner.

[Procedure 1-1] As shown in FIG. 4A, an area which is subjected to the area dividing at the first time is divided into 4 rectangular areas, and the pixel at the center of respective subareas are set to be initial area centers $C_{17}$, $C_{18}$, $C_{19}$ and $C_{20}$. $C_{17}$, $C_{18}$, $C_{19}$ and $C_{20}$ together with features of the divided areas are stored in the working memory 7. In this embodiment, the working memory 7 stores only the number of pixels in each of the divided area, the center of gravity of the area, and average colors of the area.

[Procedure 1-2] Among the areas which have already been divided, an area(s) which is in the boundary area BA adjacent to the rectangular subarea SA to be processed is extracted. The pixel number N, the average colors Cr, Cg and Cb, and the center of gravity (Cx, Cy) of the extracted area are read out from the divided area map 6. In the embodiment, the divided areas 6 and 16 are extracted. Therefore, their information, i.e., $N_6$, $Cr_6$, $Cg_6$, $Cb_6$ and $(Cx_6, Cy_6)$, and $N_{16}$, $Cr_{16}$, $Cg_{16}$, $Cb_{16}$ and $(Cx_{16}, Cy_{16})$ are read out.

Figure 5A:
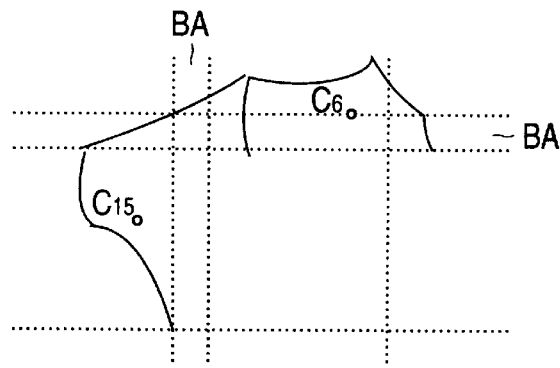
FIGS. 5A and 5B are diagrams showing a manner of splitting a divided area existing in a boundary area into two portions, a portion having pixels included in the boundary area, and portion having pixels other than those pixels.
Figure 5B:
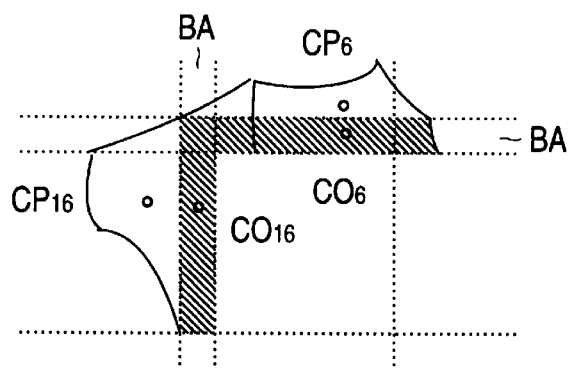

[Procedure 1-3] The divided areas which are in the boundary area BA and have already been divided are additionally held in the image buffer 1, resulting in that the image buffer 1 holds the divided areas 6, 16, 17, 18, 19 and 20. As shown in FIGS. 5A and 5B, the divided areas 6 and 16 (see FIG. 5A) are processed with being divided into two portions, the portion having pixels in the boundary area BA, and the portion having the other pixels (see FIG. 5B). The area center of divided area j (j=6, 16) having pixels in the boundary area BA is indicated by $CO_j$. The information of the divided area, i.e., the pixel number $NO_j$, the average colors $CrO_j$, $CgO_j$ and $CbO_j$, and the center of gravity $(CxO_j, CyO_j)$ are calculated from the information of the divided areas in the image buffer 1, and the calculated information is written into the working buffer 2. The values of information of the portion (the center is indicated by $CP_j$) having the other pixels, i.e., the pixel number $NP_j$, the average colors $CrP_j$, $CgP_j$ and $CbP_j$, and the center of gravity $(CxP_j, CyP_j)$ are calculated from the following expressions:

$$NP_j = N - NO_j,$$

$$CrP_j = (Cr_j * N_j - CrO_j * NO_j)/(N_j - NO_j),$$

$$CgP_j = (Cg_j * N_j - CgO_j * NO_j)/(N_j - NO_j),$$

$$CbP_j = (Cb_j * N_j - CbO_j * NO_j)/(N_j - NO_j),$$

$$CxP_j = (Cx_j * N_j - CxO_j * NO_j)/(N_j - NO_j),$$

$$CyP_j = (Cy_j * N_j - CyO_j * NO_j)/(N_j - NO_j),$$

Based on the calculated values, the corresponding values of the divided area map 6 are rewritten. The values of the working buffer 2 are changed to $N_6$, $CrO_6$, $CgO_6$, $CbO_6$, $(CxO_6, CyO_6)$, $N_{16}$, $CrO_{16}$, $CgO_{16}$, $CbO_{16}$, $(CxO_{16}, CyO_{16})$, $N_{17}$, $Cr_{17}$, $Cg_{17}$, $Cb_{17}$, $(Cx_{17}, Cy_{17})$,

·

·

$N_{20}$, $Cr_{20}$, $Cg_{20}$, $Cb_{20}$, $(Cx_{20}, Cy_{20})$.

The values of the divided area map 6 are changed to $N_1$, $Cr_1$, $Cg_1$, $Cb_1$, $(Cx_1, Cy_1)$, $N_2$, $Cr_2$, $Cg_2$, $Cb_2$, $(Cx_2, Cy_2)$,

·

·

$N_5$, $Cr_5$, $Cg_5$, $Cb_5$, $(Cx_5, Cy_5)$, $NP_6$, $CrP_6$, $CgP_6$, $CbP_6$, $(CxP_6, CyP_6)$, $N_7$, $Cr_7$, $Cg_7$, $Cb_7$, $(Cx_7, Cy_7)$,

•

•

$N_{15}$, $Cr_{15}$, $Cg_{15}$, $Cb_{15}$, $(Cx_{15}, Cy_{15})$, $NP_{16}$, $CrP_{16}$, $CgP_{16}$, $CbP_{16}$, $(CxP_{16}, CyP_{16})$.

[Procedure 1-4] The pixels held in the image buffer 1 are scanned in the sequence from the upper left corner to the lower right corner. The colors and coordinates of the pixel which is at the nth position when counted from the upper left corner are indicated by Rn, Gn, Bn, Xn and Yn, respectively. The distance $L_{j,n}$ between the pixel and the area center j in the working buffer 2 is calculated by the following expression:

$$L_{j,n,i} = ((Cr_{j,i} - Rn)^2 + (Cg_{j,i} - Gn)^2 + (Cb_{j,i} - Bn)^2) + m((Cx_{j,i} - Xn)^2 + (Cy_{j,i} - Yn)^2) \quad \text{(Ex. 1)}$$

where i indicates the number of repeated calculations, and i=0 in the first calculation.

In the expression, m is an arbitrary coefficient, and, in this case, m=1. When m is set to have a larger value, the dividing which places more emphasis on position information than color information is conducted.

With respect to the divided areas 6 and 16 in the boundary area BA, using values $CrP_6$, $CgP_6$, $CbP_6$, $CxP_6$ and $CyP_6$ or $CrP_{16}$, $CgP_{16}$, $CbP_{16}$, $CxP_{16}$ and $CyP_{16}$ which are read out from the divided area map 6, and values of the working buffer 2 of $CrO_6$, $CgO_6$, $CbO_6$, $CxO_6$ and $CyO_6$, or $CrO_{16}$, $CgO_{16}$, $CbO_{16}$, $CxO_{16}$ and $CyO_{16}$, respectively, the following values are first calculated:

$N_{j,i} = NP_j + NO_j$, $Cr_{j,i} = (CrP_j * NP_j + CrO_j * NO_j)/(NP_j + NO_j)$, $Cg_{j,i} = (CgP_j * NP_j + CgO_j * NO_j)/(NP_j + NO_j)$, $Cb_{j,i} = (CbP_j * NP_j + CbO_j * NO_j)/(NP_j + NO_j)$, $Cx_{j,i} = (CxP_j * NP_j + CxO_j * NO_j)/(NP_j + NO_j)$, $Cy_{j,i} = (CyP_j * NP_j + CyO_j * NO_j)/(NP_j + NO_j)$, where j is 6 or 16 in the embodiment.

It is a matter of course that the results obtained when the above calculations are conducted at the first time (i=1) are equal to the values which are stored in the divided area map 6 before the rewriting operation.

Using these values, the distance $L_{j,n,i}$ (where j is 6 or 16) between the pixel and the area center of the divided area C is calculated by Ex. 1.

In this way, according to the embodiment, $L_{6,n,i}$, $L_{16,n,i}$, $L_{17,n,i}$, $L_{18,n,i}$, $L_{19,n,i}$ and $L_{20,n,i}$ are calculated for the nth pixel. [Procedure 1-5] It is considered that the pixel belongs to the divided area which has the smallest value among the calculated values, $L_{6,n,i}$, $L_{16,n,i}$, $L_{17,n,i}$, $L_{18,n,i}$, $L_{19,n,i}$, and $L_{20,n,i}$. The identification number of the divided area is written at the position which corresponds to this pixel and which is in the working memory 7 that can store the same range as that of the image buffer 1, i.e., at the position of the nth position.

[Procedure 1-6] The pixels are sequentially subjected to the above-mentioned process. When the process reaches the pixel at the lower right end, the new areas for the divided areas 6, 16, 17, 18, 19 and 20 are determined. For each of the divided areas, therefore, new information, the pixel number $N_{i+1}$, the average colors $Cr_{i+1}$, $Cg_{i+1}$ and $Cb_{i+1}$, and the center of gravity $(Cx_{i+1}, Cy_{i+1})$ are obtained. In the divided areas 6 and 16 in the boundary area BA, only the portions in the image buffer 1 have been changed. Therefore, only the portions are subjected to a process of newly obtaining the pixel number $NO_{i+1}$, the average colors $CrO_{i+1}$, $CgO_{i+1}$ and $CbO_{i+1}$, and the center of gravity $(CxO_{i+1}, CyO_{i+1})$.

[Procedure 1-7] The new values of the center of gravity and the average colors of the divided areas 6 and 16 are written into the working buffer 2.

[Procedure 1-8] The calculated new center of gravity $(Cx_{i+1}, Cy_{i+1})$ and average colors $Cr_{i+1}$, $Cg_{i+1}$ and $Cb_{i+1}$ are compared with the old center of gravity $(Cx_i, Cy_i)$ and average colors $Cr_i$, $Cg_i$ and $Cb_i$. If all the differences of the new and old values are not greater than a given value k3, the information held in the working buffer 2 is written into the divided area map 6. Then the process on the rectangular subarea SA is ended, and the information stored in the working memory 7 is transferred to divided area displaying unit which is not shown. The process then moves to the next rectangular subarea SA and conducts the same operations. In the embodiment, k3=1. If any of the differences between new and old values is greater than the value, the old values in the working buffer 2 are replaced with the new values. With respect to the region j, for example, values of $N_{j,i+1}$, $Cr_{j,i+1}$, $Cg_{j,i+1}$, $Cb_{j,i+1}$, $Cx_{j,i+1}$ and $Cy_{j,i+1}$ are substituted for $N_{j,i}$, $Cr_{j,i}$, $Cg_{j,i}$, $Cb_{j,i}$, $Cx_{j,i}$ and $Cy_{j,i}$, and the operations of [Procedure 1-4] and the followings are repeated.

Figure 6:
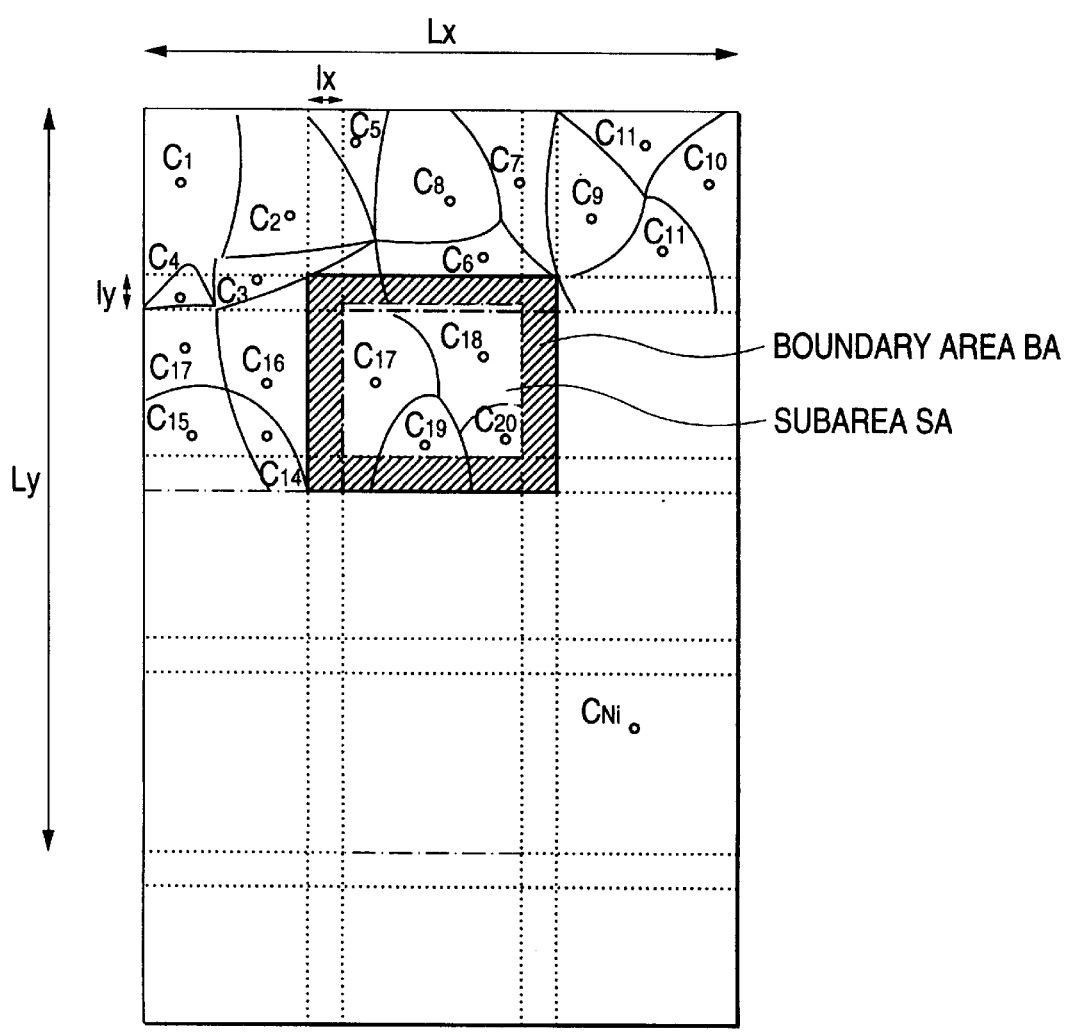
FIG. 6 is a diagram showing a manner of dividing the image area held by the image buffer.

These operations are conducted on the whole area of the image, whereby the area of the image can be divided very accurately. FIG. 6 shows results of the area dividing of the rectangular subarea SA.

EMBODIMENT 2

In the embodiment, Ex. 2 below is used in place of Ex. 1 in Embodiment 1.

$$L_{j,n,i} = (mr(Cr_{j,i} - Rn)^2 + mg(Cg_{j,i} - Gn)^2 + mb(Cb_{j,i} - Bn)^2) + m(mx(Cx_{j,i} - Xn)^2 + my(Cy_{j,i} - Yn)^2) \quad \text{(Ex. 2)}$$

where mr, mg, mb, mx and my are arbitrary coefficients.

In the same manner as Embodiment 1, the coefficient m functions to determine the ratio of emphases placed on color information and position information in the distance calculating process. In the embodiment, also mr, mg and mb may be adjusted. In this case, it is possible to instruct the processing system to lay stress on which of the colors, R, G and B. Furthermore, a flat divided area may be obtained by adjusting mx and my.

EMBODIMENT 3

In the embodiment, mr, mg, mb, mx and my in Embodiment 2 are given as functions of colors and coordinates, i.e., R, G, B, X and Y. For example, these coefficients are as follows:

$$mr = 1 \quad \text{(Ex. 3)}$$
$$mg = 1$$
$$mb = 1$$
$$mx = k\{(x - x_c)^2 + (y - y_c)^2\} + m_c$$
$$my = k\{(x_f - x_c)^2 + (y_f - y_c)^2\} - k\{(x - x_c)^2 + (y - y_c)^2\} + m_c$$

where $(x_c, y_c)$ = X and Y coordinates of an arbitrary point in the image, $(x_f, y_f)$=the pixel which is remotest from $(x_c, y_c)$, and $m_c$ and k=arbitrary constants.

When such functions are employed, mx is greater than my in the vicinity of $(x_c, y_c)$, and hence the divided area is widened in the x-direction. When $(x_c, y_c)$ is set as the center, as the pixel is further separated from the center, mx is greater than my so that the divided area is widened in the y-direction. In this way, the shape of a divided area may have positional regularity to some extent so as to produce a decorative effect.

As seen from the above, when the K-means clustering algorithm according to the invention in which the K-means clustering algorithm process is conducted in a five-dimensional system is applied to the dividing of an image, the dividing can be conducted with using a small capacity memory and in a short period.

EMBODIMENT 4

Next, we describe conditions under which the K-means clustering algorithm according to the invention can adequately function. Also present is a method for dividing an image which, when there remains inconsistency in divided areas, can eliminate the inconsistency.

Figure 7:
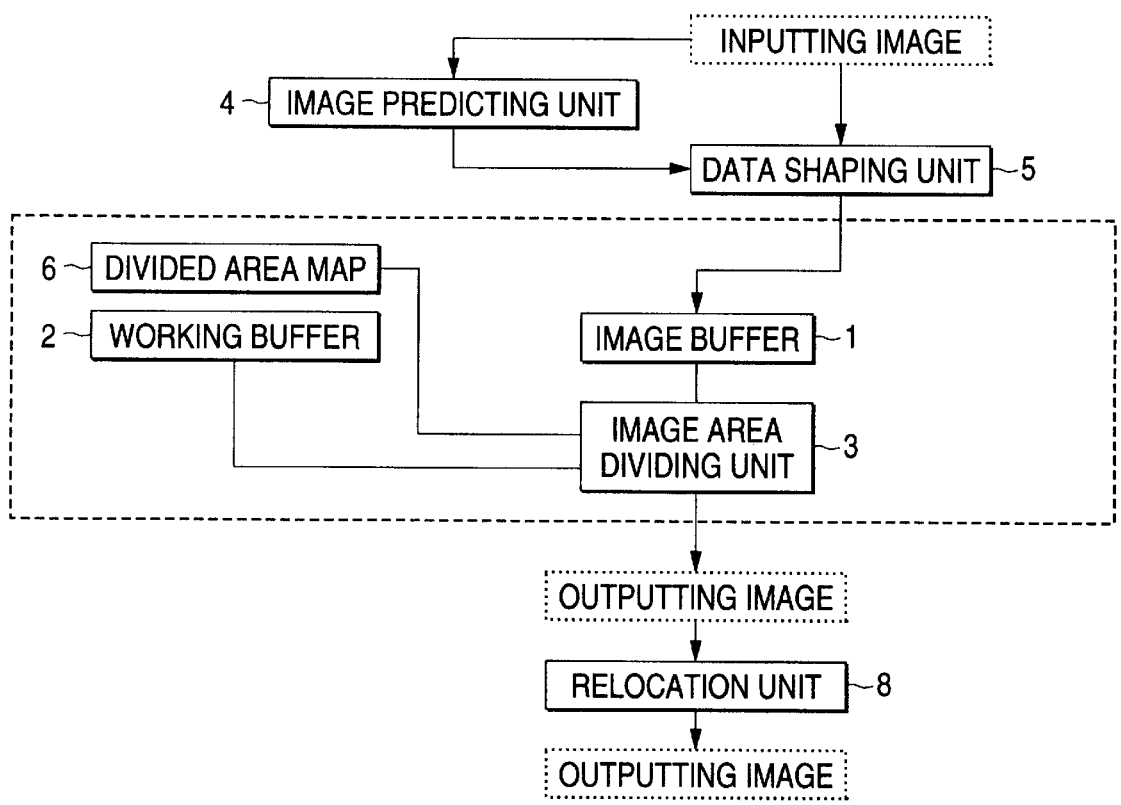
FIG. 7 is a block diagram showing the basic configuration of another image area dividing apparatus to which the invention is applied.

FIG. 7 is a block diagram showing the basic configuration of an image area dividing apparatus which can eliminate unnaturalness from an image that has undergone the dividing process. The image area dividing apparatus shown in FIG. 7 is structured in the same manner as that shown in FIG. 1 except that a relocation unit 8 is added to the configuration of FIG. 1. After a series of operations has ended, the relocation unit 8 eliminates unnaturalness from an image by using information in the divided area map 6.

In the example shown in FIG. 7, conditions are shown under which the divided K-means clustering algorithm operates in an optimum manner. In the divided K-means clustering algorithm, when a large image is divided into plural rectangular subareas SA and boundary areas BA in the periphery of the rectangular subareas SA (see FIG. 2A). The image dividing is conducted on each of the subareas. Information is held in the image buffer 1 and related to pixels of the rectangular subarea SA and divided areas in the boundary area BA in the periphery of the subareas. Information stored in the divided area map 6 and related to all divided areas is utilized so that various problems which may be caused in the rectangular subarea SA and its periphery by the dividing are prevented from arising. In the example shown in FIG. 7, furthermore, when a divided area has an unnatural shape which fails to coincide with the image texture, it is possible to eliminate the unnaturalness.

In the dividing process which has been described with reference to FIGS. 1 to 6, satisfactory results can be obtained when the distance Lj between the area center and a pixel which, among pixels in divided area j in the images shown in FIG. 2, is farthest from the center of a divided area. The following conditions must be satisfied (where Lx and Ly indicate the lengths of each image in the lateral and vertical direction, Ni indicates the number of area centers, and lx and ly indicate the widths of each boundary area):

Condition 1

$Ln < lx \times 5$, $Ln < ly \times 5$, and $Ln = \{(Lx \times Ly)/(Ni \times \pi)\}^{1/2}$, and Condition 2

$L_{Max} < (lx) \times 6$, $L_{Max} < (ly) \times 6$, and $L_{Max} = \text{Max}(Lj)$.

When a divided area having unnaturalness is caused to remain because it was impossible to conduct the area dividing under the conditions indicated above, a relocation process is additionally conducted.

The relocation process is conducted by relocation unit 8 after a series of dividing processes is ended, in the procedures described below.

[Procedure 2-1] A pixel constituting the divided area where there remains inconsistency is extracted.

[Procedure 2-2] The distance between the pixel and all center areas stored in the divided area is recalculated.

[Procedure 2-3] The divided area to which the pixel belongs is changed to the divided area having the area center which is nearest to the pixel.

In other words, all the pixels constituting a divided area where there remains inconsistency are only subjected once to the process which is to be repeatedly conducted in accordance with the K-means clustering algorithm.

Figure 8:
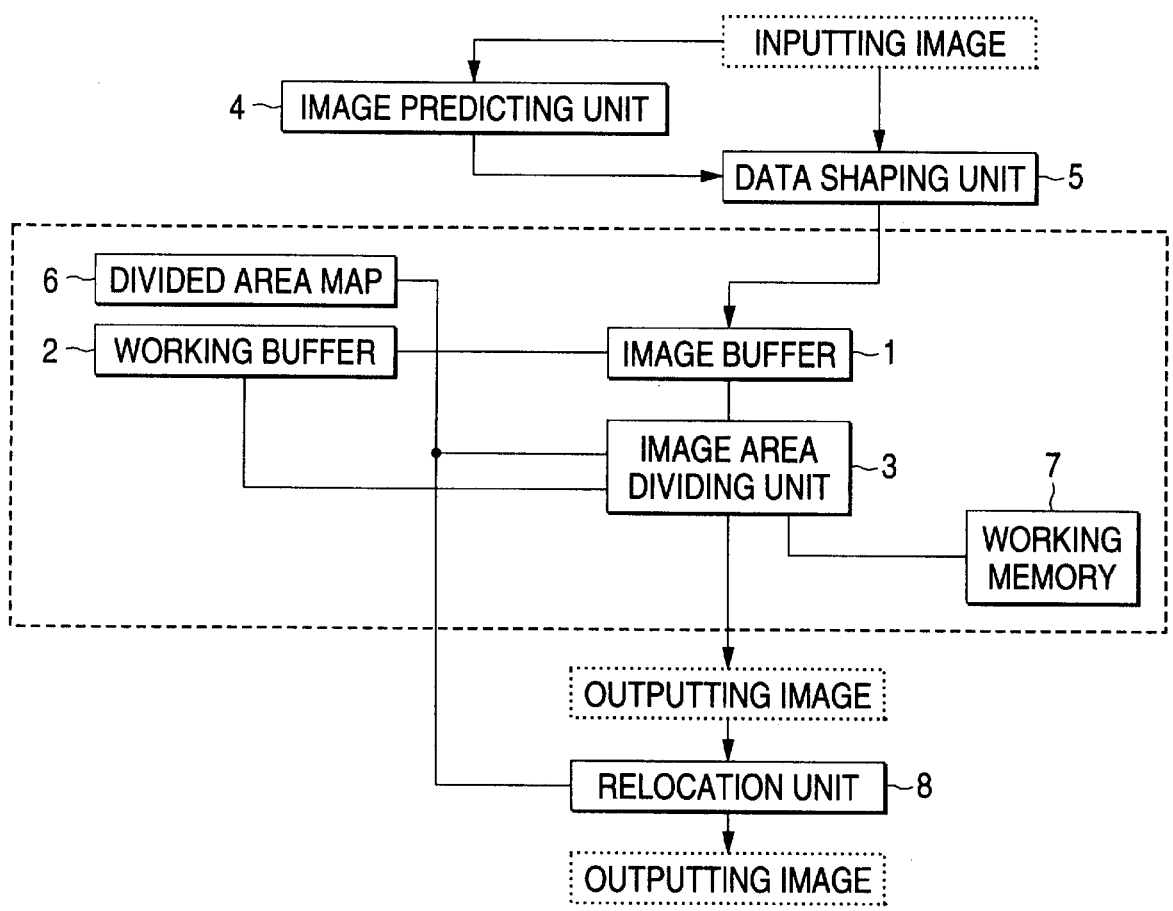
FIG. 8 is a block diagram of the other embodiment of an image area dividing apparatus to which the invention is applied.

FIG. 8 is a block diagram of another embodiment of an image area dividing apparatus to which the present invention is applied. The apparatus is basically structured in the same manner as that shown in FIG. 1.

The operation of the apparatus will again be described using specific values and in accordance with the actual flow of data. It is assumed that image data having Lx pixels in the lateral direction and Ly pixels in the vertical direction have been shaped by the data shaping unit so as to have a suitable form.

The shaped data are divided into N×M rectangular subareas (N indicates the number of divided subareas in the lateral direction, and M the number of divided subareas in the vertical direction). In this embodiment, parameters are determined so as to satisfy the following conditions:

Condition 1

$Ln < lx \times 5$, $Ln < ly \times 5$, and $Ln = \{(Lx \times Ly)/(Ni \times \pi)\}^{1/2}$, and Condition 2

$L_{Max} < (lx) \times 6$, $L_{Max} < (ly) \times 6$, and $L_{Max} = \text{Max}(Lj)$.

The case where N and M are set to be 3 and 5, respectively or image data are divided into 15 rectangular subareas SA will be considered. Boundary areas BA are formed between adjacent rectangular subareas SA. Only the image area which is held in image buffer 1 can be processed at one time. The portion obtained by eliminating the area which is subjected to the area dividing the first time (the area contained by the broken line) from the image area (the area contained by the thick line) which is held in the image buffer 1, for example, shown in FIG. 1 has already been subjected to area dividing. Sixteen area centers are placed in the area which is subjected to the area dividing the first time by area dividing of one rectangular subarea SA and a boundary area BA in the periphery of the subarea. The boundary area BA has a width of lx pixels in the x-direction, and a width of ly pixels in the y-direction. When the value of lx is set to be equal to (⅕)×the width of the rectangular subarea, that of ly to be equal to (⅕)×the height of the rectangular subarea, and lx=ly, the following expressions are obtained:

$$Lx=lx*(3*5+2), \text{ and } Ly=ly*(5*5+4).$$

Therefore, the following relationship is attained:

$$Ln=\{lx^2*(3*5+2)*(5*5+4)/(16*15*\pi)\}^{1/2}$$

$$Ln=lx*\{(3*5+2)*(5*5+4)/(16*15*\pi)\}^{1/2}$$

$Ln=lx*0.809$

Accordingly, Condition 1 is satisfied.

Regarding Condition 2, calculations are done after dividing. However, Condition 2 can be satisfied by selecting the number of divided subareas satisfying Condition 1, and an adequate value of m (m>1) in Exs. 1 and 2. The image buffer 1 must have a size sufficient for holding data of the pixels in a rectangular subarea SA and a boundary area BA in the periphery of the subarea. Therefore, the sizes of the image buffer 1 in the vertical and lateral directions are required to be 1.4 times those of a rectangular subarea SA, respectively. The set of a rectangular subarea SA to be processed and a boundary area BA is sequentially shifted rightward starting from the one at the upper left corner. When the process reaches the set at the right end, the process is transferred to the next row and then continued while sequentially moving in sequence starting from the set at the left end.

It is assumed that dividing the area of several rectangular subareas SA and boundary areas BA in the periphery of them has been completed. FIG. 4A shows the areas which have already been processed, the rectangular subarea SA which is currently processed, and the boundary area BA on the periphery of the subarea SA.

In the area dividing, the K-means clustering algorithm in a five-dimensional system in which x- and y-axes exist in addition to the axes of three colors or R, G and B is used. The process is conducted in the sequence of [Procedure 1-1] to [Procedure 1-8] which have been described above.

These operations are conducted on the whole area of the image, whereby the area of the image can be divided vary accurately. FIGS. 5A and 5B shows results of dividing the rectangular subarea SA.

As a result of the above-described procedures, even a large image can be divided in a short amount of time.

Figure 9:
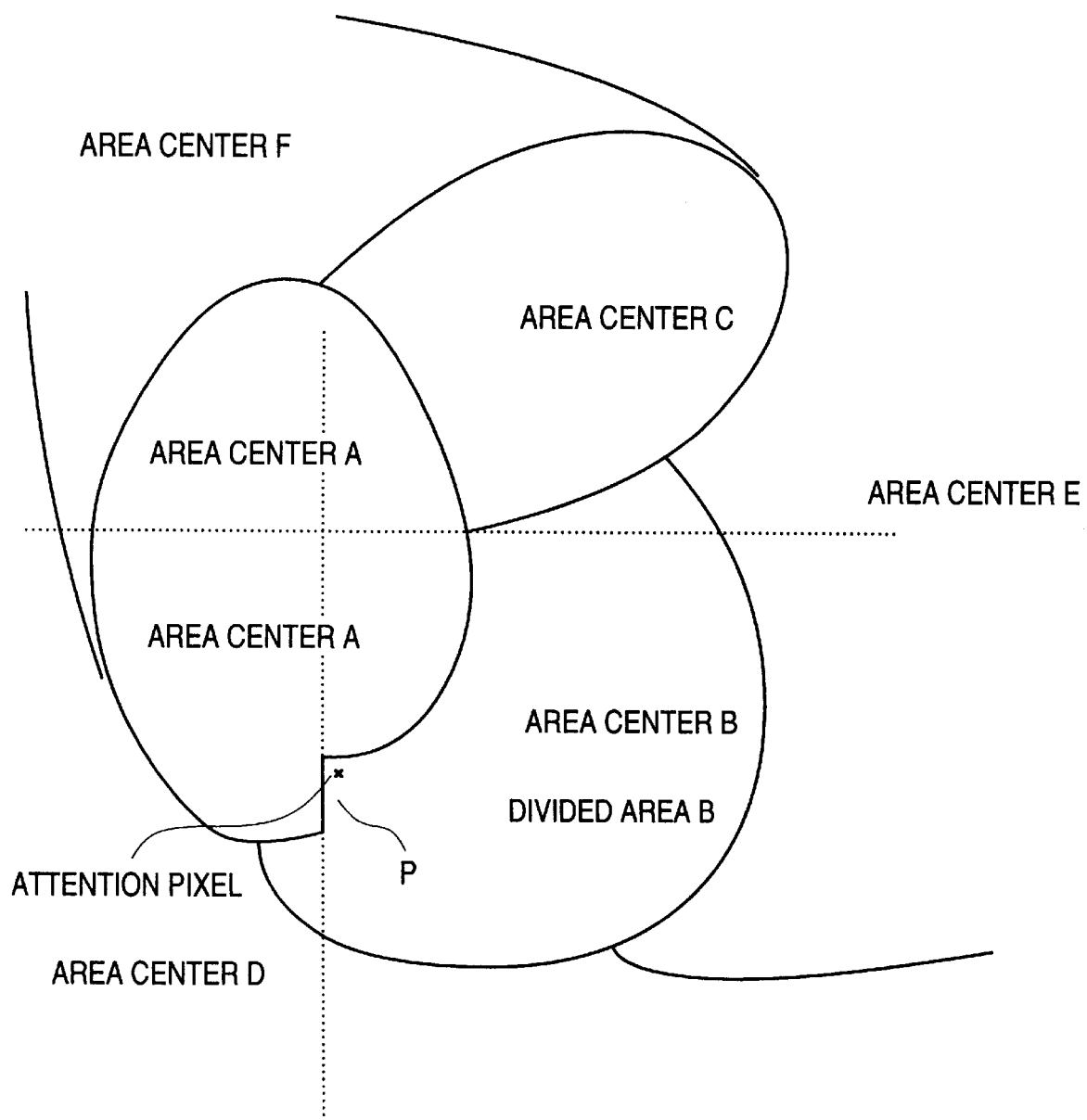
FIG. 9 is a diagram showing divided, areas in which dividing is conducted unnaturally.

In the case where the two conditions indicated above cannot be satisfied, however, unnatural divided areas such as those shown in FIG. 9 remain in the image. FIG. 9 shows an example where an image is divided into five divided areas A, B, C, D and E and a boundary of boundary areas in the portion indicated by the arrow P remains in the divided areas. A method of eliminating such unnatural areas will be described.

[Procedure 3-1] First, an unnatural area must be detected. In order to detect such an area, for example, a method is employed in which the fact that a part of a boundary area is constituted by a line which is an outline of a rectangular subarea SA is used as a guide. In this embodiment, such a line exists at the boundary between the, divided areas A and B.

[Procedure 3-2] Pixels constituting the area are picked up one by one, and the distance between each pixel and an area center in the vicinity of the area or distances between each pixel and all area centers are obtained. In the embodiment, the divided areas A and B are unnatural areas. Attention is given to a pixel in the divided area B. The distances between the pixel and the area centers of peripheral divided areas including the divided area B to which the pixel belongs (i.e., the area centers of the divided areas A, B, C, D, E and F) are calculated by Ex. 1.

[Procedure 3-3] The dividing is repeated so that the pixel enters the area in which the shortest distance is attained. As a result of the process, when the distance between the area center A and the interested pixel in the figure is shorter than that between the area center B and the pixel, the pixel is relocated in the divided area A.

Figure 10:
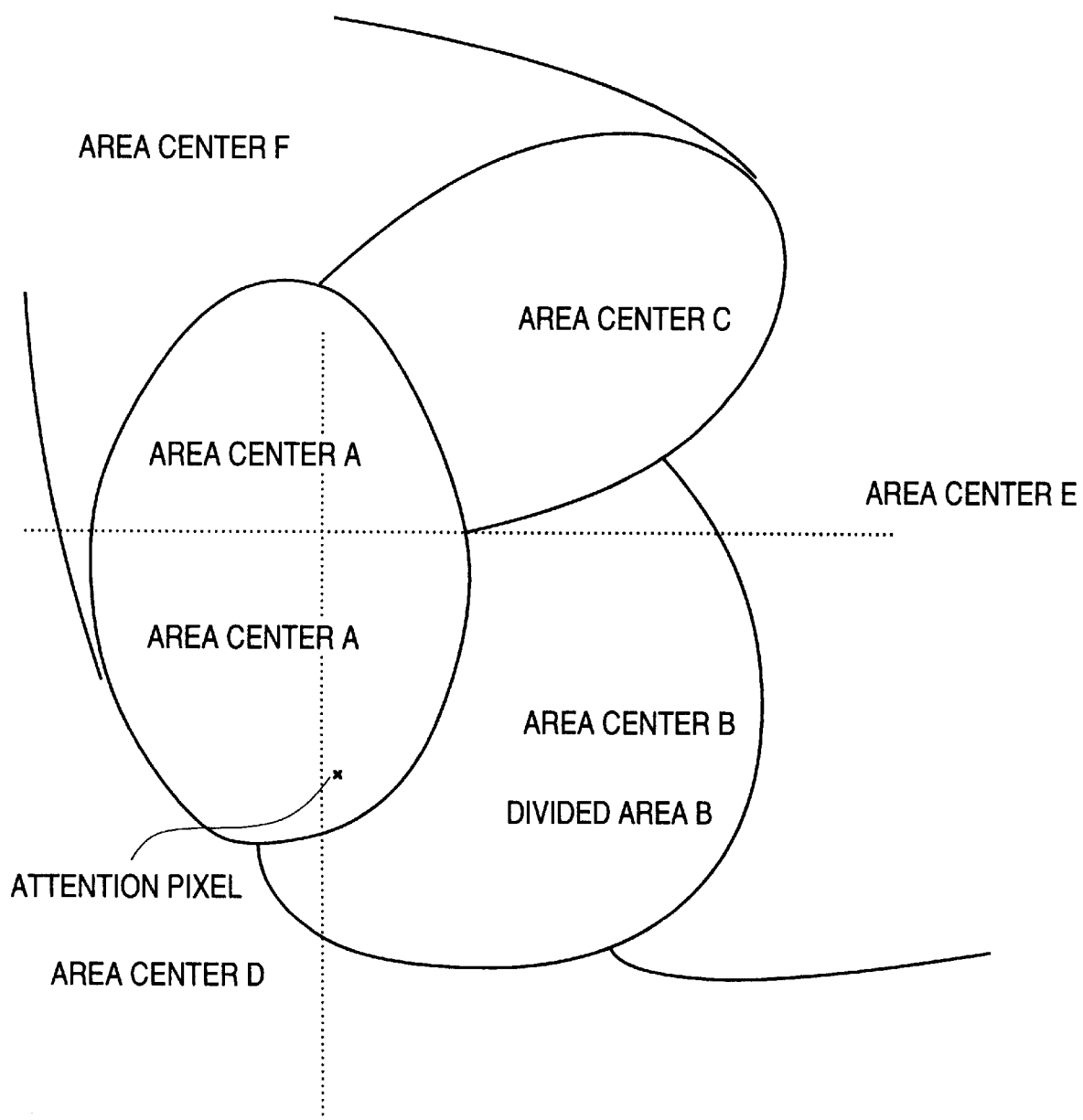
FIG. 10 is a diagram showing divided areas in which unnatural dividing is eliminated as a result of conducting a relocation process.

[Procedure 3-4] The operations are conducted on the pixels constituting all the unnatural areas, whereby the unnatural areas can be eliminated as shown in FIG. 10.

EMBODIMENT 5

In the above-described embodiment, when the relocation process is to be conducted, an area enclosed by an unnatural outline is extracted, and then the relocation process is conducted only on pixels in the area. Alternatively, this process may not be conducted, and the relocation process may be conducted on all pixels of the image. In the alternative, a long processing period is required, but the area dividing process can be conducted with the result having a closer correspondence to the texture of the original image.

Further, in the above described embodiment, as shown in FIG. 3, the width lx of the boundary area BA is set to be equal to (⅕)×the width of the rectangular subarea SA, and the width of the boundary area BA in the y-direction is set to be equal to (⅕)×the height of the rectangular subarea SA. Alternatively, the dividing process may be conducted under the conditions of lx=0 and ly=0 which do not satisfy above-mentioned Condition 1. In the alternative, the processing time can be shortened, but an outline of each rectangular subarea SA will remain in the divided area. Therefore, a lattice pattern appears in an image obtained as a result of such dividing. When the relocation process is conducted on such an image, however, the lattice pattern completely disappears so that, when looking the image, unnaturalness is considerably eliminated.

EMBODIMENT 6

Next, a process for integrating an image which has been subjected to the area dividing process in the manner described above will be described.

As described above, in a process wherein highly common image features which can be used in various image processing applications are extracted and collated, it has recently been attempted to organize such features for each image area so that the features are easily used during subsequent image processing. Also in such organization, it is required to adequately divide an image into areas. One of the conditions of appropriate area dividing is that the number of divided areas suits the application.

Depending on the kind of area dividing technique employed, it is impossible initially to divide an image in a manner adequate for the purpose of utilization. Generally, it is rare that proper segmentation into an appropriate number of divided areas is produced from the initial application of this technique.

Therefore, it is very important to adjust the number of divided areas by conducting an integration process after segmentation.

As described above, the area dividing and integration are difficult techniques which must be conducted in different manners depending on the purpose of utilization. No optimum method of area dividing or integration has yet been developed. It is possible to use information of typical colors, etc. of each divided area and position information of the divided area, as information in the process of integration. Furthermore, it is possible to employ a method in which values of adjacent pixels of adjacent divided areas are compared with each other. Many methods of integrating areas require data from of an input image which has not yet been divided. However, a method in which pixels of an input image are processed one by one is time consuming and is complicated. With respect to a background portion having gradations which may appear in several portions of an image, integration cannot be done well even when only adjacent areas are integrated, or when areas of similar colors are integrated.

Hereinafter, an image integration method will be described which can integrate a large image using a small capacity working memory in a short period of time. Areas that are not necessarily adjacent to each other but are close to each other and have similar properties are coupled in a chain-like manner to be finally integrated into one image.

This image integration method includes an area integration map. Typical colors and centers of gravity of all divided areas are applied to results of dividing which has once been conducted. The areas are integrated so as to suit the purpose of the resulting utilization of divided images.

Figure 11:
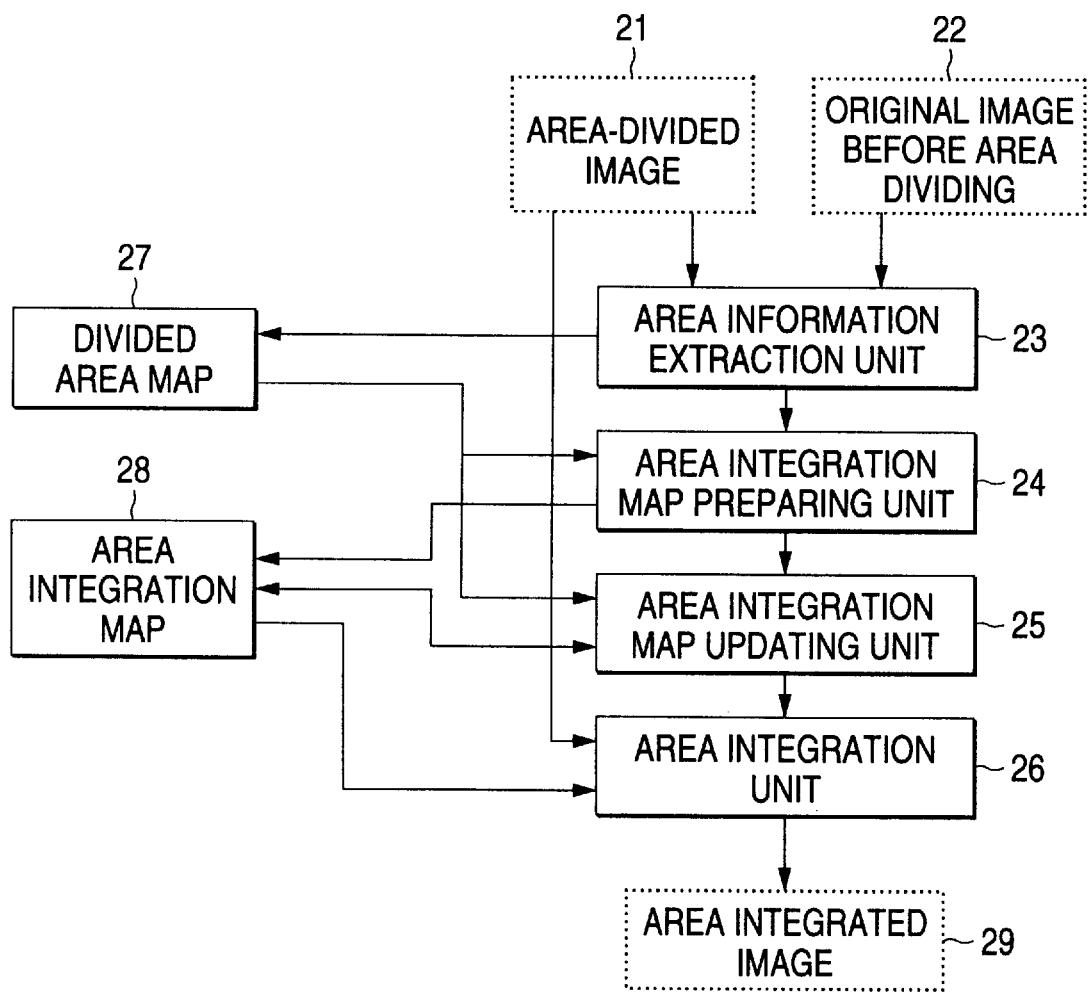
FIG. 11 is a block diagram showing the basic configuration of an area integration apparatus.

FIG. 11 shows an apparatus for embodying the image integration method. An area information extraction unit 23 calculates at least typical colors and the center of gravity of each divided area, and more preferably texture information of the divided area, from an area-divided image 21 and an original image 22 from which the divided image has been obtained. The calculated information is written into a divided area map 27.

Area integration map preparing unit 24 calculates distances between the area center of each of the divided areas and area centers of the other divided areas, lists top N divided areas having shortest distances, and writes the listed divided areas into an area integration map with respect to all of the divided areas (see FIG. 12A). With respect to each of the listed N divided areas, area integration map updating unit 25 calculates similarities in color and texture between the divided area and that which was used as the reference in the distance calculation. If the similarities are greater than a reference value K, the divided area is integrated and the divided area is not deleted from the area integration map 28. By contrast, if the similarities are smaller than the reference value K, it is determined not to integrate the divided area and the divided area is deleted from the area integration map 28 (see FIG. 12B).

When the operation ends, there is a large number of duplicated information in the area integration map 28. Therefore, the area integration map is collated (see FIG. 12C).

Finally, using the collated area integration map 28, the divided areas of the area-divided image 21 are integrated and a resulting area-integrated image 29 is output.

Figure 13:
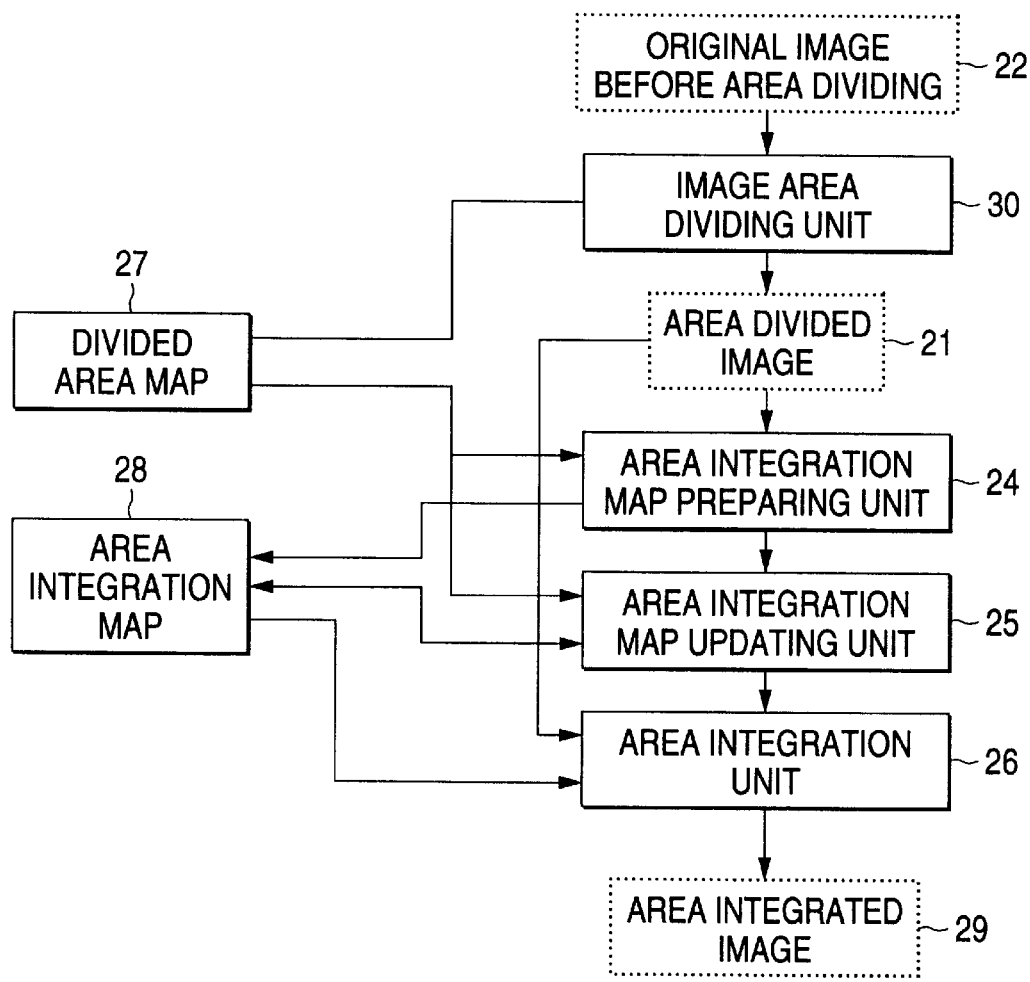
FIG. 13 is a block diagram showing an embodiment of an area integration apparatus.

FIG. 13 is a block diagram of an embodiment of an image dividing apparatus to which the invention is applied. The apparatus has a basic structure similar to that shown in FIG. 11. Image area dividing unit 30 employs the K-means clustering algorithm to be executed in a five-dimensional system, i.e., color elements of an image, such as R, G and B, and x and y coordinates of an image. According to this configuration, at the instant when the area dividing is ended, the divided area map 27 in which typical colors and centers of gravity of divided areas are recorded has already been prepared. Therefore, the area integrating process can be realized with using only information of the divided area map 27, and the area-divided image 21.

Figure 14:
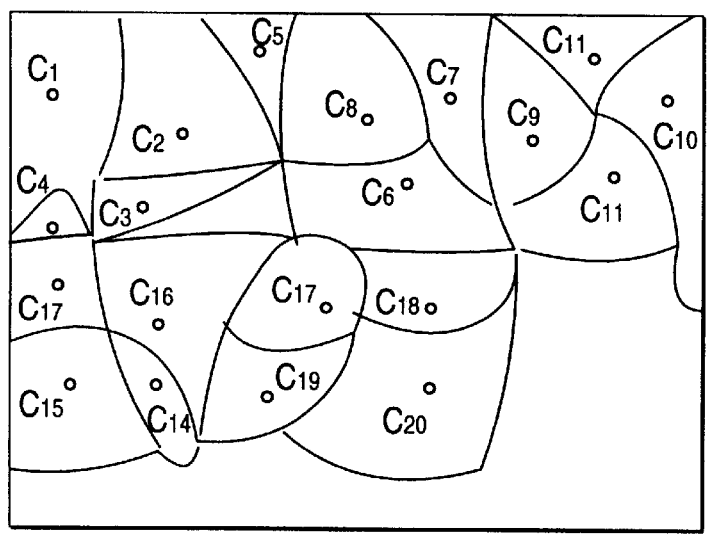
FIG. 14 is a diagram showing an image which has been subjected to the area dividing.

FIG. 14 shows a part of results obtained after the area dividing, and FIG. 15 shows the divided area map 27. In the divided area map 27, recorded are the number of pixels in each of the divided areas which were used in the area dividing process, average colors of the area, and the center of gravity of the area. The area integration map preparing unit 24 reads out the value of the center of gravity of divided area 1 from the divided area map 27, calculates Euclidean distances between the value and the other divided areas, and lists the top 8 divided areas having the shortest distances. These operations are conducted on all the divided areas (see FIG. 16A). Next, color differences $H_{ij}$ between the typical colors of divided area 1 and divided areas j listed in the area integration map are obtained by the following expression:

$$H_{ij}=(Cr_1-Cr_j)^2+(Cg_1-Cg_j)^2+(Cb_1-Cb_j)^2$$

Figure 17:
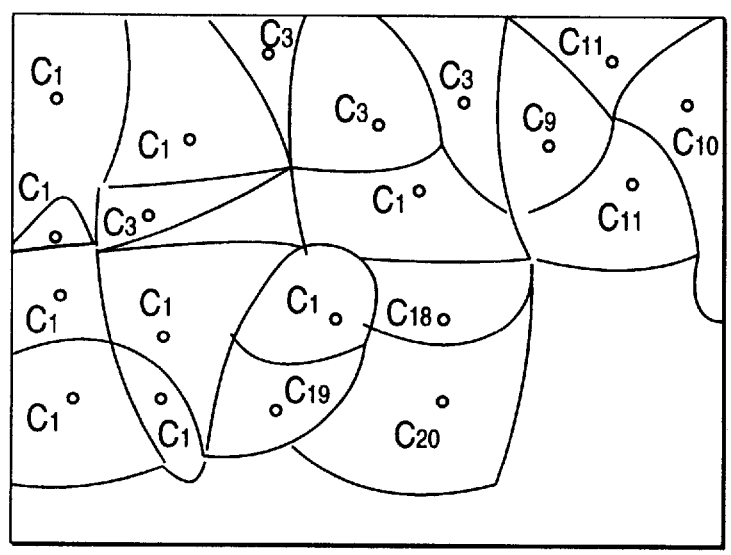
FIG. 17 is a diagram showing results of the area integration.

If $H_{ij}$ is smaller than a predetermined value K, divided area j is not deleted from the area integration map 28, and, if $H_{ij}$ is greater than K, divided area j is deleted from the area integration map 28. The operation is conducted on all the divided areas (see FIG. 16B). The area integration map updating unit 25 then deletes duplicated data so that the area integration map shown in FIG. 16C is obtained. FIG. 17 shows an image which is obtained by integrating a part of the area-divided image of FIG. 14 in accordance with the updated area integration map.

In the above-described area integrating process, areas can be integrated in a preferred manner without requiring a large amount of information. Even when areas are not adjacent to each other, the areas can be integrated as far as they are close to each other and have similar properties. Therefore, a background portion, etc. having gradations which may appear in several portions of an image can be coupled in a chain-like manner to be finally integrated into an image.

The area integrating process can be applied also to an image which has been divided by a method different from the above-described image area dividing methods.

According to the invention, the area dividing which conforms to the texture of an image can appropriately be conducted with using a small capacity memory and in a short period of time. Even in the case where unsatisfactory dividing results are obtained, when the relocation process is conducted, it is possible to attain a high improvement effect.

What is claimed is:

1. A method for segmenting quantized multi-gradational image data into areas corresponding to image texture comprising the steps of:

creating in said quantized multi-gradational image data a plurality of rectangular subareas and a plurality of rectangular boundary areas located between adjacent subareas;

dividing said image data in each of said rectangular subareas and rectangular boundary areas into subareas corresponding to an image texture;

recalculating a closest area center of pixels included in said divided area bounded by an unnatural outline, wherein said closest area center is an area center having the shortest distance between a pixel in a divided area with an inconsistency and area centers stored in said divided area;

relocating said pixels included in said divided area bounded by an unnatural outline; and relocating said closest area center.

2. The method of claim 1 wherein the step of dividing further includes the substep of:

using computed information from a previously divided rectangular boundary area adjacent a rectangular subarea currently being divided.

3. The method of claim 2, wherein the step of using computed information further includes the substep of:

computing information from three pixel color elements, an average value of x and y coordinates specifying a location of data in said quantized multi-gradational image, and a total number of pixels in said divided area.

4. The method of claim 1, wherein said dividing step further includes the substep of:

computing a K-means clustering using a five dimensional space including three dimensions corresponding to the three color elements of data in said quantized multi-gradational image and two dimensions represented by x and y in the image.

5. The method of claim 4, wherein said step of computing a K-means clustering includes the substep of:

computing a distance measure incorporating a coefficient representing a ratio of contribution rates of said two dimensions represented by x and y in the image and the contribution rates of said three color elements.

6. The method of claim 5, wherein said substep of computing a distance measure includes the substep of:

computing a distance between a pixel in one of said rectangular subareas and a center of said divided subarea.

7. The method of claim 1, wherein said dividing step further includes the substep of:

selecting distance measures Ln and $L_{Max}$ according to the following conditions Condition 1

$Ln < lx \times 5$, $Ln < ly \times 5$, and $Ln = \{(Lx \times Ly)/(Ni \times \pi)\}^{1/2}$, and Condition 2

$L_{Max} < (lx) \times 6$, $L_{Max} < (ly) \times 6$, and $L_{Max} = \text{Max}(Lj)$, where Lx and Ly are lengths of said image in a lateral direction and a vertical direction respectively, Ni indicates the number of centers located in said divided area, lx and ly indicate a horizontal width and a vertical length respectively of said boundary area respectively, and Lj is a distance between a center of said divided area and a pixel which, among pixels in said divided area, is farthest from said center of said divided area.

8. The method of claim 7, further comprising the steps of:

calculating a distance from a first divided area center to other divided area centers;

listing divided areas having the shortest calculated distance;

calculating a similarity value comparing color and image texture among said first divided area and said listed divided areas; and integrating said first divided area with at least one of said listed divided areas having said similarity value greater than a reference value.

9. The method of claim 1, further comprising the steps of:

calculating a distance from a first divided area center to other divided area centers;

listing divided areas having the shortest calculated distance;

calculating a similarity value comparing color and image texture among said first divided area and said listed divided areas; and integrating said first divided area with at least one of said listed divided areas having said similarity value greater than a reference value.

* * * * *